(12) United States Patent
Lugo Saucedo et al.

(10) Patent No.: US 7,155,201 B2
(45) Date of Patent: *Dec. 26, 2006

(54) METHOD AND NETWORK FOR EMERGENCY CALL SERVICES

(75) Inventors: Maria Selene Lugo Saucedo, Coahuila (MX); Raul D. Cardenas Flores, Coahuila (MX)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 572 days.

This patent is subject to a terminal disclaimer.

(21) Appl. No.: 09/880,266

(22) Filed: Jun. 13, 2001

(65) Prior Publication Data

US 2002/0042260 A1    Apr. 11, 2002

Related U.S. Application Data

(60) Provisional application No. 60/236,895, filed on Sep. 29, 2000.

(51) Int. Cl.
   H04M 11/04    (2006.01)
(52) U.S. Cl. .............. 455/404.1; 455/456.1; 455/456.2; 455/456.3; 455/436; 455/439; 455/432.1; 455/445; 455/521; 455/417; 455/416; 455/440; 379/45; 379/88.2; 379/142.15; 379/88.21; 342/458
(58) Field of Classification Search ............ 455/404.1, 455/404.2, 456.1, 456.2, 456.5, 416, 445, 455/436, 437; 379/45, 49, 207, 88.2, 88.21, 379/142.15; 342/458
See application file for complete search history.

(56) References Cited

U.S. PATENT DOCUMENTS

| | | | | |
|---|---|---|---|---|
| 5,797,093 A | * | 8/1998 | Houde | 455/404.1 |
| 6,292,542 B1 | * | 9/2001 | Bilder | 379/45 |
| 6,356,751 B1 | * | 3/2002 | Valentine et al. | 455/404.1 |
| 6,522,882 B1 | * | 2/2003 | Chen et al. | 455/439 |
| 6,594,492 B1 | * | 7/2003 | Choi et al. | 455/436 |
| 6,671,620 B1 | * | 12/2003 | Garin et al. | 701/213 |

OTHER PUBLICATIONS

TR 45 J STD 036, Enhanced Wireless 9-1-1-Phase 2.

* cited by examiner

Primary Examiner—Joseph Feild
Assistant Examiner—Randy Peaches (57) ABSTRACT

A method and network provide mobile information for emergency calls based on mobile position during a call in progress. As soon as an Emergency Services Call is invoked, the Mobile Station position information is gathered using a Serving Entity. The position is then sent to an Anchor Entity [typically an Anchor Mobile Switching Center (AMSC) and Anchor Mobile Position Center (AMPC)] in communication with the Emergency Services Network Entity (ESNE). After receiving the position information, the Anchor Entity makes the call setup to the ESNE, and the AMSC updates the AMPC.

In one alternative embodiment, the Position Determining Entity determines the troubled and non-troubled locations and sends them to the ESNE. In a second alternative embodiment, only the troubled party location is sent to the ESNE as a result of the non-troubled party triggering a special key code during the request for the ESNE.

13 Claims, 5 Drawing Sheets

METHOD AND NETWORK FOR EMERGENCY CALL SERVICES

RELATED APPLICATIONS

This application claims the benefit under Title 35 United States Code §199(e) of U.S. Provisional Application No. 60/236,895 filed Sep. 29, 2000.

BACKGROUND OF THE INVENTION

1. Technical Field

This invention relates generally to Emergency Call Services. More particularly, this invention relates to a method and network to provide mobile for emergency calls based on mobile station position during a call in progress.

2. History of Related Art

The increase in emergency calls made by mobile subscribers has led to the development of several telecommunications standards for Emergency Call Services such as J-STD-036, "Enhanced Wireless 9-1-1, Phase 2" drafted by the American National Standards Institute (ANSI) and the Telecommunications Industry Association (TIA), incorporated herein by reference in its entirety. The J-STD-036 standard utilizes the concept of positioning for tracing the location of an emergency call. One problem that exists with this tracing method is that the emergency location which actually needs to be provided to the emergency center is frequently not equivalent to the location of the telephone placing the Emergency 911 (E-911) call. Moreover, position location under the current method requires many signaling messages to be sent over the telecommunications network between the different entities, delaying connection with the emergency center. For example, during a routine call between an A-Subscriber and a B-Subscriber, assume an unexpected emergency situation arises involving the A-Subscriber. Under the prior art scenario, if the A-Subscriber's conversation with the B-Subscriber is interrupted, the B-Subscriber knows that something is wrong, places the call with the A-Subscriber on hold, and dials 911 to contact an emergency service provider communicating through an Emergency Services Network Entity (ESNE). Under the current position location method, the B-Subscriber's location will be calculated since the B-Subscriber triggered the call, while A-Subscriber is the party requiring emergency assistance.

Currently, the J-STD-036 solution is based on a positioning request to the Anchor Mobile Switching Center (MSC), which is transmitted to the Anchor Mobile Position Center (MPC) for mobile capabilities and position request type. Since the Mobile Station (MS) is not served by the Anchor MSC, the request is sent back to the Anchor MSC which forwards the request to the Serving MSC. The Serving MSC, in turn, requests the cached position from the Serving MPC, which will request the position from its Position Determining Entity (PDE) for the current E-911 call. Once the PDE provides the position to the serving MPC, it is transmitted to the Serving MSC. Then the position is transmitted to the Anchor MSC as a return result for the requested order. The Anchor MSC then supplies an answer to the initial position request from the Anchor MPC, which finally provides the geographic position of B to the Anchor MSC in order to make the call setup with the ESNE.

Several problems may arise in this scenario. A considerable amount of time and a significant number of network messages are required for the Anchor MSC to set up the emergency call to the ESNE. While all this occurs, several additional events may arise, such as network congestion, handoff to a third party, or other unexpected situations at the MS, such as a low battery condition. This may result in tragic consequences because of the emergency nature of the call. What is needed is a method and network which will give the emergency services provider accurate information regarding the true location of the emergency using a minimum number of network messages.

SUMMARY OF THE INVENTION

The invention is a method and network which operates to reduce the number of messages typically required for providing location information to an Emergency Services Entity (ESE). More particularly, the present invention applies to a call which involves three parties: a first party engaged in conversation with a second party, who in turn attempts to contact an ESE (such as an ESNE) as a third party during the ongoing conversation between the first and second parties. A typical scenario involves a party (the second party) engaged in a call (with the first party) who arrives at the scene of the accident. The second party reacts to the emergency by maintaining the original call with the first party (placing the first party on hold) and initiating a 911 emergency call to an ESE. The prior art requires many signaling messages to determine the location of the calling party before the call can be established between the calling party and the ESE.

Essentially, the method and network of the present invention operate to gather position information using the Serving Entity (usually a Serving Mobile Switching Center (SMSC) and its associated Serving Mobile Position Center (SMPC)) to obtain the position of the calling party Mobile Station (MS) as soon as an Emergency Services Call (ESC) is initiated. After the position (i.e., the current location) is obtained via the SMPC and its associated Position Determining Entity (PDE), the position can be sent to an Anchor Entity in communication with the ESE. The Anchor Entity typically includes an Anchor Mobile Switching Center (AMSC) and its associated Mobile Position Center (AMPC). After the position is received by the Anchor Entity, the call set-up is made to the ESE (such as an ESNE) by the Anchor Entity, and the AMPC has its position updated by the AMSC.

As described above, the typical scenario involving the method of the invention begins by initiating an ESC to a third party while an ongoing two-way call (which has been handed off) is in progress. In this example, American National Standards Institute (ANSI)-41 signaling messages are used, although other signaling protocols may also be used to effect the method of the invention. The method continues with a SMSC requesting the current location of the calling party from the SMPC using an Intersystem Position Request (ISPOSREQ) message, including information about the MS. Since location information is not cached, the SMPC forwards the request for the current location to the appropriate PDE using a Geoposition Request (GPOSREQ) message, for example, including the MS information.

The PDE then determines the current location of the calling party MS, and returns the location information in a gposreq response with the PositionResult parameter set to indicate that an updated position/location has been returned. The SMPC forwards the location of the MS using an isposreq response with the PositionResult parameter set to indicate that an updated position/location is being returned. The SMSC notifies the next switch in the handoff chain (in this case, typically the AMSC) using a Flash Request (FLASHREQ) message, including the current position of the calling party MS. The AMSC then acknowledges the message with a flashrequest response, and the AMSC sets up the ESC with the ESE (e.g., an ESNE) using the received location of the MS. The AMSC then updates the AMPC with the position received using a Geoposition Direct (GPOSDIR) message from the SMSC, and the AMPC caches the updated position and acknowledges the update with a geoposdir response.

Two alternative embodiments of the method of the invention may also be implemented. Assume that a party (a "troubled party") is engaged in an on-going conversation with the party making a call (i.e., the "non-troubled party") to the ESE (e.g., an ESNE), and that the troubled party is located at a "troubled location" and the non-troubled party is located at a "non-troubled location". The first alternative embodiment provides for the troubled location and the non-troubled location to be determined by the PDE and sent to the ESE. The second alternative embodiment only provides the troubled location to the ESE, triggered by receipt of a special key code (e.g., dialing "911+#" or some other key sequence) entered by the non-troubled party during the request for the ESC.

DETAILED DESCRIPTION OF PRESENTLY PREFERRED EXEMPLARY EMBODIMENTS

Figure 1:
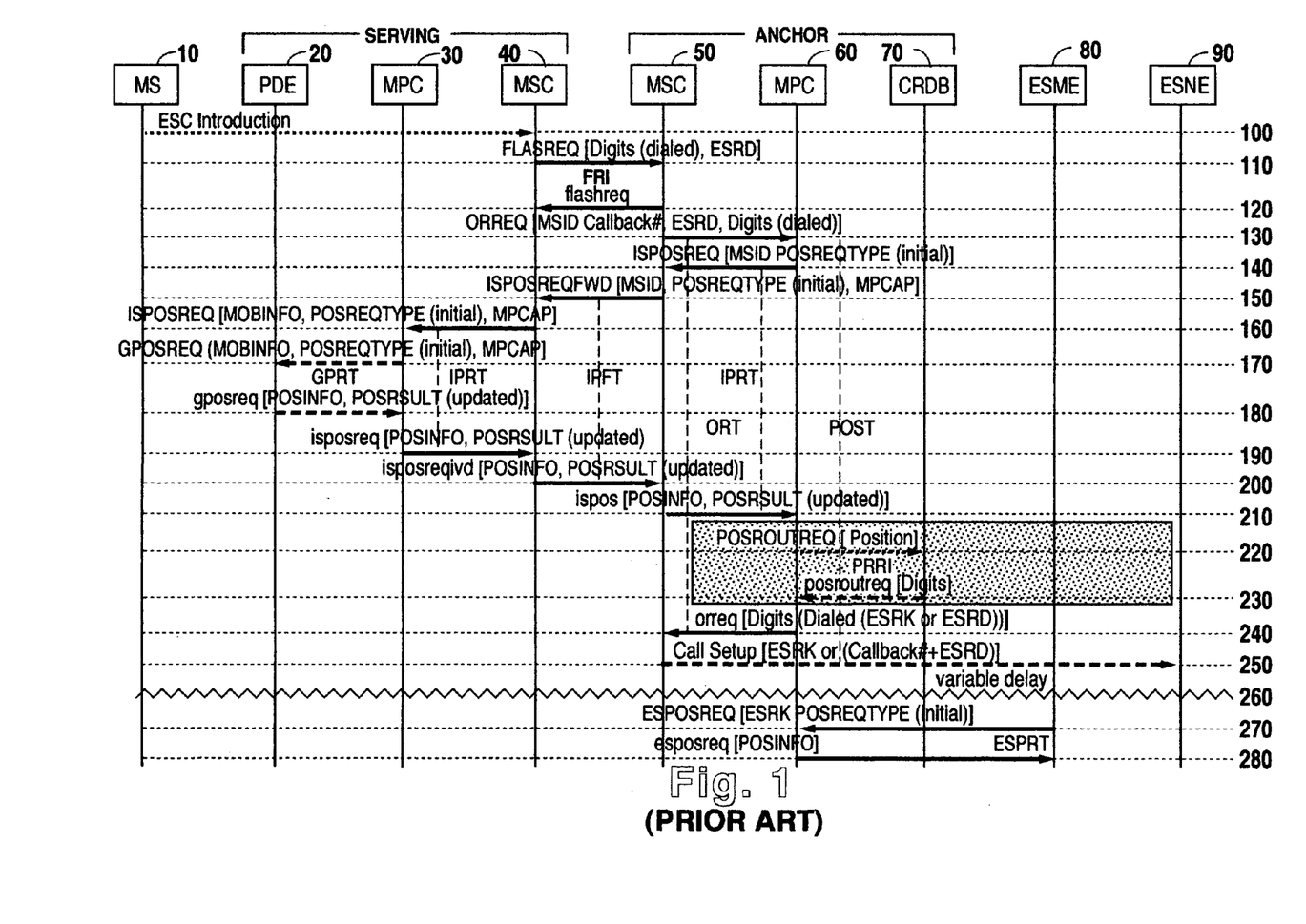
FIG. 1 is a network signal flow diagram illustrating a prior art Emergency Services Call operations sequence.

FIG. 1 is a prior art message flow diagram which illustrates an Emergency Services Call (ESC) originated as the second leg of a three-way call after a handoff to obtain instructions for routing the call to an appropriate ESNE 90. This diagram clearly shows the many messages required to obtain the necessary location data to complete the ESC call under the prior art. The Figure assumes that a call that has been handed-off from the Anchor MSC 50 to the Serving MSC 40 is in progress. The MS 10 initiates an ESC in step 100. The Serving MSC 40 notifies the Anchor MSC 50 of the event with a FLASHREQ message in step 110. The Anchor MSC 50 acknowledges the event with a flashreq response in step 120. The Anchor MSC 50 analyzes the digits dialed by the MS 10 and sends an Origination Request (ORREQ) message to the Anchor MPC 60 in step 130. The Anchor MPC 60, having not received the mobile information in the ORREQ message, requests position or mobile identification information from the Anchor MSC 50 with an ISPOSREQ message in step 140. The Anchor MSC 50, knowing the MS 10 is handed off, forwards the request in an Intersystem Position Request Forward (ISPOSREQFWD) message in step 150.

The Serving MSC 40 forwards the request for position to the Serving MPC 30 with an ISPOSREQ message in step 160. Since the Serving MPC 30 has mobile information, it can query the proper PDE 20 directly with a GPOSREQ message in step 170. Optionally, a handset-based solution may utilize PDE 20 to MS 10 communication.

In this case, the PDE 20 has not previously acquired the initial position of the MS 10. Therefore, the PDE 20 determines the current position of the MS 10 and returns the position information in a gposreq response with the PositionResult parameter set to Updated Position Returned in step 180. The Serving MPC 30 then returns the MS 10 position for the MS 10 with an isposreq response in step 190, and the Serving MSC 40 returns the MS 10 position with an isposreqfwd response in step 200. The Anchor MSC 50 then returns the MS 10 position with an isposreq response, which is cached by the Anchor MPC 60 as "initial" position" in step 210. Optionally, the Anchor MPC 60 may use the MS's 10 current position to request a routing translation for an Emergency Services Zone (ESZ) from the Coordinate Routing Database (CRDB) 70 with a Position Route Request (POSROUTREQ) message in step 220. The CRDB 70 then returns the digits representing an ESZ to the Anchor MPC 60 with a posroutreq response in step 230.

The Anchor MPC 60 selects a Public Safety Answering Point (PSAP) based on the ESZ from the CRDB 70 or from the latitude and longitude of the MS 10 based on local procedures. The MPC 60 then assigns and returns a unique routable call identifier (ESRK) for the particular PSAP selected, or Emergency Services Routing Digits (ESRD) in the orreq response in step 240. The Anchor MSC 50 routes the Emergency Services Call toward the PSAP selected by the ESRK or ESRD in step 250. Then there will be a variable delay depending on the specific circumstances as indicated in step 260. The ESME 80 requests the initial position in step 270. In response, the Anchor MPC 60 returns the cached position in step 280.

The problem in this scenario is the amount of signaling required to set up the call, i.e., 6 network messages from the time of ESC initiation until the call is set up with the ESNE 90 by the Anchor MSC 50. During this period, various contingencies such as network congestion, handoffs, or low battery conditions may occur which can hinder message transmission speed, with potentially disastrous consequences.

Figure 2A:
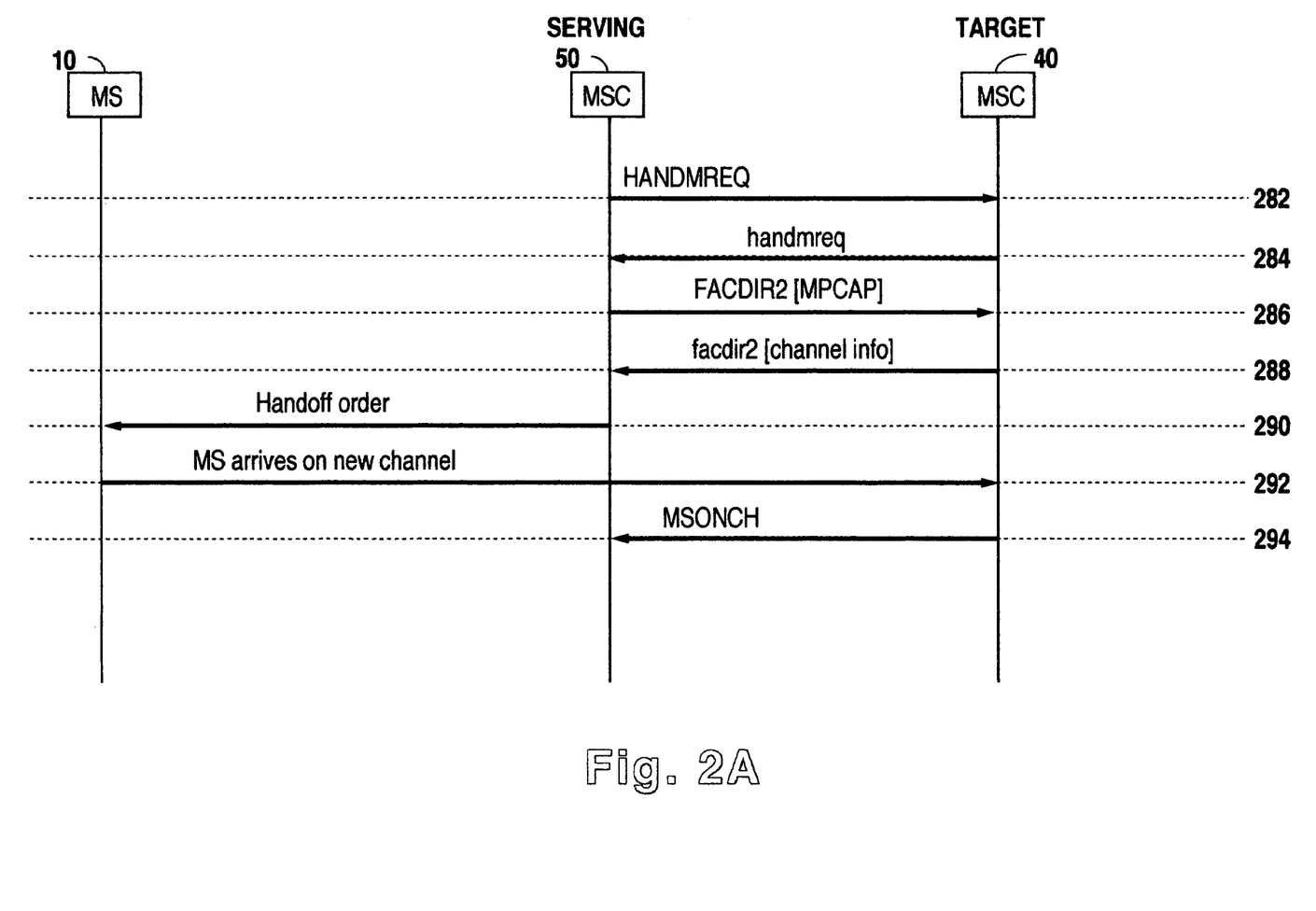
FIGS. 2A and 2B are network signal flow diagrams illustrating the method and network of the present invention.

FIG. 2A is a network signal flow diagram illustrating MS movement to another exchange (Handoff Forward). As the MS 10 moves, the signal strength decreases. The Serving MSC 50 sends a HANDMREQ message to the candidate MSC 40 in step 282. The candidate MSC 40 performs location measurements and returns the results to the Serving MSC 50 (handmreq response) in step 284. The Serving MSC 50 then determines that the call should be handed off to the now Target MSC 40, and sends a Facilities Directive 2 (FACDIR2) message, including the Mobile Position Capability parameter (MPCAP) (which indicates the type of geographic position information the MS 10 can provide to the network), to initiate a Handoff Forward Task in step 286. A voice channel is designated; and the MPCAP is stored in the Target MSC 40 and a facdir2 response is sent back as an answer in step 288. The Serving MSC 40 then sends the Mobile Handoff Order to the MS 10 and the MS 10 is received on the designated voice channel. The target MSC (now the serving MSC 40) sends a Mobile on Channel message to the Anchor, indicating that the MS 10 is now being served by the MSC 100 in step 294.

Figure 2B:
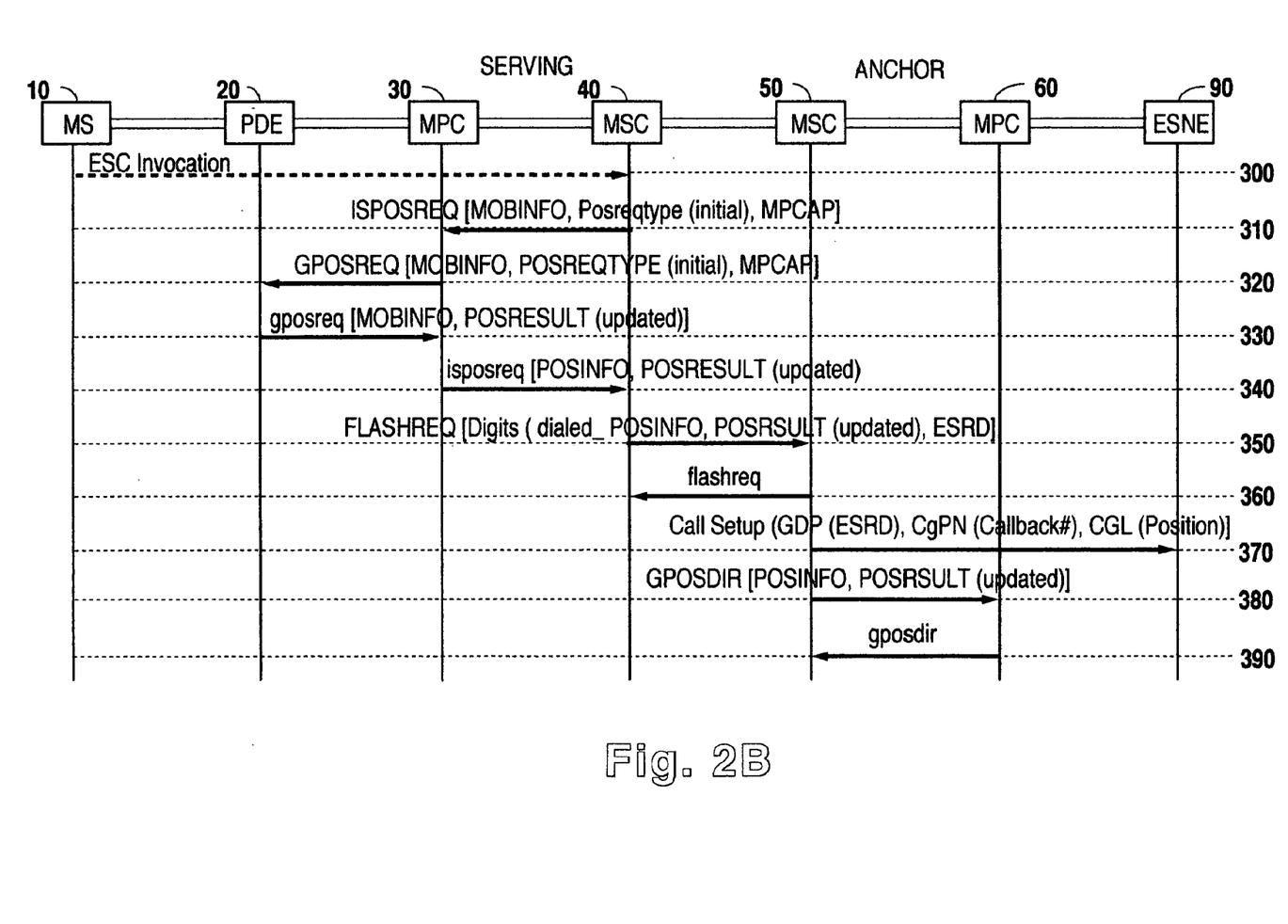

Turning now to FIG. 2B, the message flow diagram illustrates the initiation of an ESC using the method of the present invention. This embodiment includes the scenario wherein the subscriber in trouble (operating the MS 10) has dialed E-911 to report that the location to be calculated corresponds to the position of the MS 10. In order to reduce the time required to connect the call, once the Serving MSC 40 receives the E-911 call initiation, it requests the position calculations and provides this information to the Anchor MSC 50 to connect the call. Thus, the method greatly reduces the amount of signaling required between the Serving MSC 40 and the Anchor MSC 50, as compared to using the prior art method described in J-STD-036.

As shown in step 300 of FIG. 2B, an MS 10 invokes an Emergency Services Call via 3-way calling while another call is in progress between the MS 10 and another party. The Serving MSC 40 requests the position of the MS 10 from the Serving MPC 30 with an ISPOSREQ message including the mobile information in step 310. The Mobile Position Capability parameter (MPCAP) indicates the type of geographic position information that the MS can provide to the network. The MPCAP was previously received by the Serving MSC 40 in a Facilities Directive 2 invoke message (as part of the inter-exchange handoff forward scenario shown in FIG. 2A). Since there is no cached position information, the Serving MPC 30 forwards the request for position to the appropriate PDE 20 with a GPOSREQ message including the mobile information in step 320. The PDE 20 determines the current position of the MS 10 and returns the position information in a gposreq response with the PositionResult parameter set to Updated Position Returned in step 330. The Serving MPC 30 forwards the position for the MS 10 with an isposreq response with Position Result set to Updated Position Returned in step 340. The Serving MSC 40 then notifies the next switch in the handoff chain of the event with a FLASHREQ message, including the current position in step 350. The Anchor MSC 50 returns the flashrequest response in step 360, and completes the call setup with the ESNE 90 using an Initial Address Message (IAM) including the received geographic position in step 370. The Anchor MSC 50 updates the Anchor MPC 60 with the last position received from the Serving MSC 40 in step 380, and the Anchor MPC 60 in turn caches the updated position received and acknowledges the event with a geoposdir response in step 390.

Figure 3:
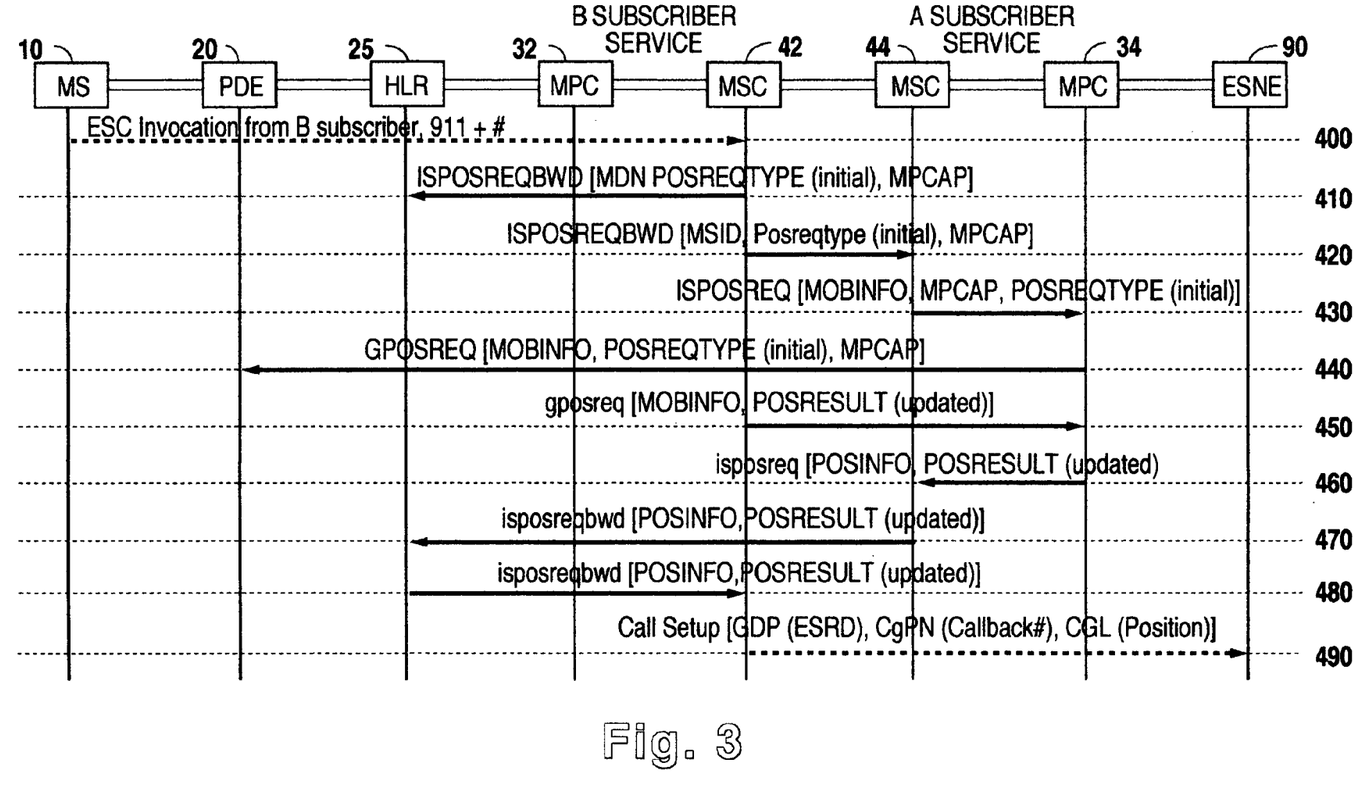
FIG. 3 is a network signal flow diagram illustrating a first alternative embodiment of the present invention wherein the non-troubled subscriber reports that the location to be calculated corresponds to the troubled subscriber.
Figure 4:
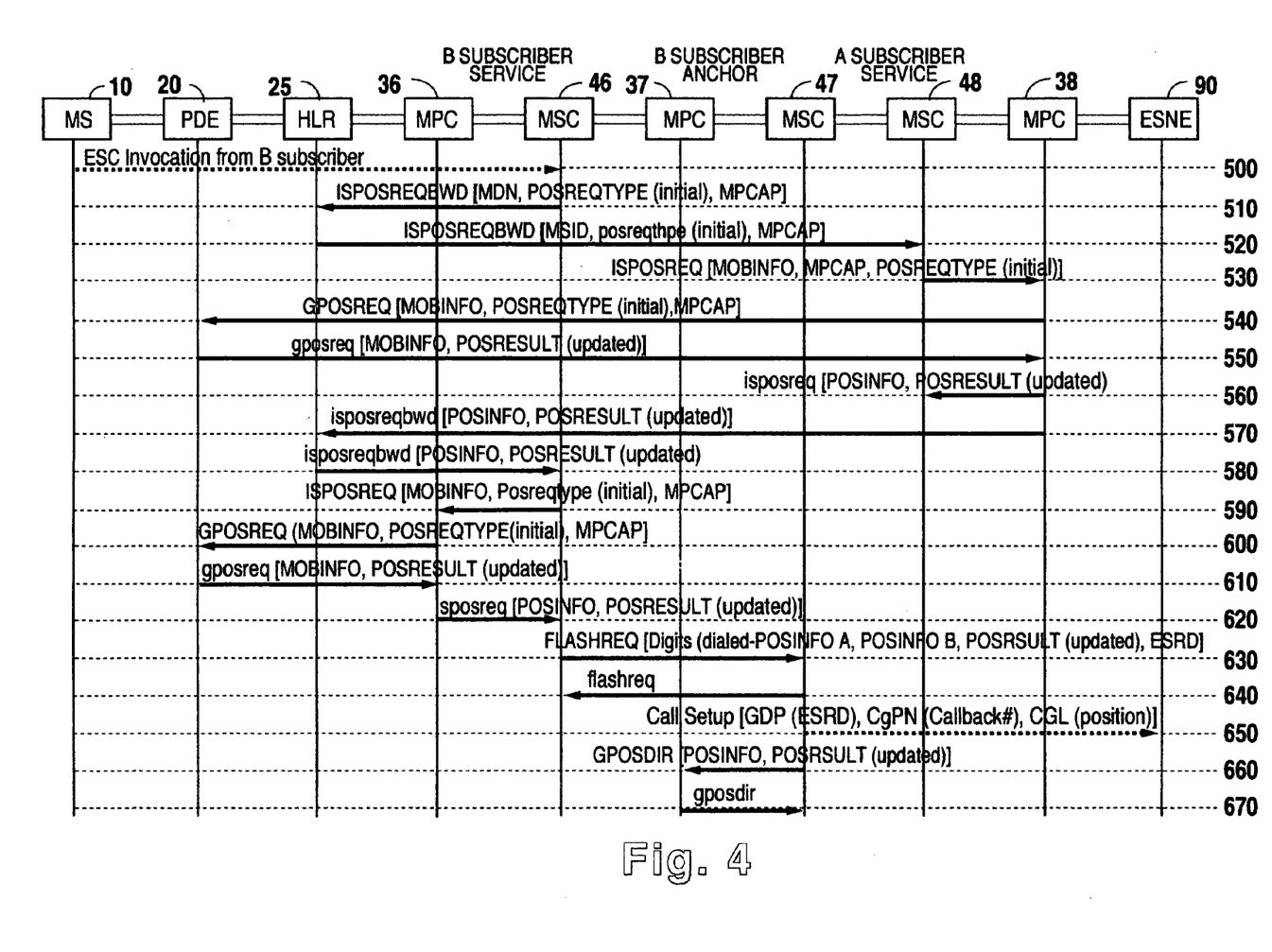
FIG. 4 is a network signal flow diagram illustrating a second alternative embodiment of the present invention wherein the MSC knows that the Emergency Call is a three-way call and requests both the troubled and non-troubled locations.

FIGS. 3 and 4 are network signal flow diagrams illustrating invocation of an Emergency Services Call with the method of the present invention in an embodiment wherein the subscriber triggering the ESC is not the subscriber in trouble (or is not at the location of the trouble). FIG. 3 illustrates the method utilized by the non-troubled subscriber to designate that the location to be calculated corresponds to the troubled subscriber. FIG. 4 illustrates the method utilized in the present invention when the MSC knows that the Emergency Call is a three-way call and requests both the troubled and non-troubled locations.

In FIG. 3, the MS 10 non-troubled (B-Subscriber) invokes an ESC via 3-way calling while another call is in progress with notification that the position requested is for the A-Subscriber (i.e., troubled subscriber) as shown in step 400. The B-Subscriber does this by dialing "911"+# (or any other special key) which designates that the location to be calculated corresponds to the A-Subscriber. In this scenario, the A-Subscriber is registered at a different MSC 42 and the HLR 25 has recorded the last MS 10 position (the identification of the last serving MSC 44 for the MS 10). The current serving MSC 42 requests the position to HLR 25 by sending a new message, Intersystem Position Request Backward (ISPOSREQBWD), via Global Title Transfer (GTT) in step 410. The message includes the Mobile Directory Number (MDN), the Position Request type (POSREQTYPE, which indicates whether the initial or recent position information for the MS is being requested i.e., the value 1 is initial position), and the MPCAP (which indicates the type of geographic position information the MS can provide to the network, i.e., the value 52 is TDMA assisted GPS) parameters. The HLR 25 has the Mobile Station Identification (MSID) information and the identification information of the MSC (MSCID) where the A-Subscriber was last registered, including the Mobile Directory Number (MDN). The HLR 25 translates the MDN into a MSID and requests the position from the MSC 44 where the A-Subscriber was last registered by sending the new ISPOSREQBWD message in step 420, including the Mobile Station Identification (MSID), the Position Request Type (POSREQTYPE), and the MPCAP parameters. The MSC 44 then requests the position of the A-Subscriber from the MPC 34 with an ISPOSREQ message in step 430, including the Position Request Type (POSREQTYPE), the MPCAP, and the information regarding the MS radio access (MOBINFO, in order to calculate the position of the MS according to the radio access technology) parameters. The MPC 34 relays the position request to the appropriate PDE 20 with a GPOSREQ message in step 440, and the PDE 20 determines the current position of the MS 10 so the position information can be returned to the MPC 34 in a gposreq response with the PositionResult parameter set to Updated Position Returned in step 450.

The MPC 34 forwards the position for the MS 10 to the MSC 44 with an isposreq response with Position Result set to Updated Position Returned in step 460. The MSC 44 (where the A-Subscriber was last registered), notifies the HLR 25 using the PositionResult parameter with a new isposreqbwd response in step 470, including the Position Information (POSINFO, which is used to carry the time-position pair used to locate an MS, i.e., values for GeneralizedTime, GeographicPosition, and PositionSource) and the Position Result (POSRESULT, which indicates the result e.g., success or failure of an associated position request, i.e., the value 3 is last known position returned) parameters. The HLR 25 forwards the position to the MSC 42 where the transaction was initiated using a new isposreqbwd response in step 480. The MSC 42 then sets up the call with the ESNE 90 using an LAM including the received geographic position for A-Subscriber in step 490, including the GenericDigitsParameter (GDP, which carries the routing digits of the outgoing trunk, in this case toward the ESRD) and the Calling Geodetic Location (CGL, which is included in the parameter GEOPOS to provide MS latitude and longitude and a confidence level for the geodetic position) parameters.

In FIG. 4, the MSC determines that the ESC is a three-way call, requests the troubled and non-troubled locations, and provides both locations to the ESE. In this scenario, the B-subscriber has been handed off and requests the location for the A-Subscriber and the system calculates both the A-Subscriber (i.e., troubled subscriber) and B-Subscriber (i.e., non-troubled subscriber) positions. As shown in step 500, the MS 10 (B-Subscriber) invokes an ESC via 3-way calling while another call is in progress with notification that the position requested is for the A-Subscriber. The Serving MSC 46 requests the position from the HLR 25 with the new message, ISPOSREQBWD, using GTT in step 510 including the MDN as the routing address. The parameters for this message are the same as described for step 410. The HLR 25 translates the MDN into a MSID and requests the position from the MSC 48 where the A-Subscriber was last registered using the new ISPOSREQBWD message in step 520. The parameters for this message are the same as described for step 420. The MSC 48 requests the position of the A-Subscriber to the MPC 38 with an ISPOSREQ message in step 530. The MPC 38 relays the position request to the appropriate PDE 20 with a GPOSREQ message in step 540. The PDE 20 then determines the current position of the A-Subscriber and returns the position information to the MPC 38 in a gposreq response with the PositionResult parameter set to Updated Position Returned in step 550. The MPC 38 forwards the position for the A-Subscriber to the MSC 48 with an isposreq response with Position Result set to Updated Position Returned in step 560. The MSC 48 where the A-Subscriber was last registered notifies the HLR 25 using the PositionResult parameter in the new isposreqbwd response in step 570. The HLR 25 forwards the position to the MSC 46 where the transaction was initiated via the new isposreqbwd response in step 580. The parameters for these responses may be the same as described for steps 470 and 480, respectively. The Serving MSC 46 then requests the position from the Serving MPC 36 with an ISPOSREQ message including the mobile information in step 590.

As shown in FIGS. 3 and 4, the network of the invention includes an Anchor Entity for updating the current location subsequent to setting up the ESC, a Serving Entity in electronic communication with the Anchor Entity, a Position Determining Entity (PDE) in electronic communication with the Serving Entity, and an Emergency Services Entity (ESE) in electronic communication with the Anchor Entity. The Anchor Entity may include an Anchor Mobile Switching Center (AMSC) in electronic communication with the Serving Entity, and an associated Mobile Position Center (AMPC) in electronic communication with the AMSC. The Serving Entity may include a Serving Mobile Switching Center (SMSC) in electronic communication with the PDE, and an associated Mobile Position Center (SMPC) in electronic communication with the SMSC, and the ESC may be an Emergency Services Network Entity. Table I represents a summary of the needed changes (new messages, modified messages, and added parameters) for the J-STD-036 standard, as might be required to implement one application of this invention.

TABLE 1

| Functional Entities | Message(s) | Comments | Reference |
|---|---|---|---|
| MSC-MSC | Flash request | Modified. Add POSINFO and POSRESULT parameters | ANSI 41.D and J-STD-036 |
| MSC-MSC | Facilities Directive 2 (Invoke) (FACDIR2) | Modified. Add MPCAP parameter | ANSI 41.D and J-STD-036 |
| MSC-MPC | GPOSDIR | Modified. Invoked from the MSC to the MPC | ANSI 41.D and J-STD-036 |
| MSC-HLR HLR-MSC | Intersystem Position Request Backward ISPOSREQBWD | New. Message to request position from different subscriber. | ISPOSREQBWD This message is used to order MS position information. INVOKE: Contents / Type  MDN / O POSREQTYPE / O MPCAP / O MSID / O RETURN RESULT: Contents / Type  POSINFO / O POSRESULT / O |

Since there is no cached position information, the MPC 36 forwards the request for position to the appropriate PDE 20 with a GPOSREQ message including the mobile information in step 600. The PDE 20 then determines the current position of the MS 10 and returns the position information in a gposreq response with the PositionResult parameter set to Updated Position Returned in step 610. The Serving MPC 36 forwards the position of the MS 10 with an isposreq response with Position Result set to Updated Position Returned in step 620. The Serving MSC 46 then notifies the next switch in the handoff chain of the event with a FLASHREQ message, including the current position in step 630. The Anchor MSC 47 returns the flashrequest response in step 640. The MSC 47 sets up the call with the ESNE 90 using an LAM including the received geographic position of both the A-Subscriber and the B-Subscriber such that both positions are sent in step 650. The MSC 47 updates the MPC 37 with the last position received from the Serving MSC 46 in step 660, and the MPC 37 caches the updated position received and acknowledges the event using a geoposdir response in step 670.

Although the invention has been described with reference to specific embodiments, this description is not meant to be construed in a limited sense. The various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention, or their equivalents.

What is claimed is:

1. A method of managing an Emergency Services Call (ESC) within a mobile network while a subscriber is engaged in an on-going call, wherein the network includes a serving entity, an anchor entity, a Position Determination Entity (PDE), and an Emergency Services Entity (ESE), the method comprising the steps of:

handing off the on-going call from the anchor entity to the serving entity;

responsive to an emergency condition, the subscriber invoking the ESC via 3-way calling while maintaining the on-going call;

receiving a request for the ESC at the serving entity;
receiving a request for a current geographic position of the subscriber at the PDE;
determining the current geographic position of the subscriber by the PDE;
receiving the current geographic position of the subscriber at the serving entity;
sending the current geographic position to the anchor entity;
setting up the ESC between the anchor entity and the ESE, wherein the current geographic position is included in the call setup message; and
updating the anchor entity with the current geographic position.

2. The method of claim 1, wherein the step of receiving a request for the ESC at the serving entity further includes the step of:
receiving the request for the ESC after the on-going call is placed on hold.

3. The method of claim 1, wherein the serving entity includes a Serving Mobile Switching Center (SMSC) and an associated Mobile Position Center (SMPC), and wherein the step of receiving a request for a current location of the subscriber at the PDE further includes the steps of:
sending an Intersystem Position Request (ISPOSREQ) message from the SMSC to the SMPC; and
sending a Geoposition Request (GPOSREQ) from the SMPC to the PDE.

4. The method of claim 1, wherein the serving entity includes a Serving Mobile Switching Center (SMSC) and an associated Mobile Position Center (SMPC), and wherein the step of receiving the current location of the subscriber at the serving entity further includes the steps of:
sending a response including the current location of the subscriber from the PDE to the SMPC; and
sending an isposreq response including the current location of the subscriber from the SMPC to the SMSC.

5. The method of claim 1, wherein the serving entity includes a Serving Mobile Switching Center (SMSC) and an associated Mobile Position Center (SMPC), and wherein the step of sending the current location to the anchor entity further includes the step of:
sending a Flash Request (FLASHREQ) message including the current location from the serving entity to the anchor entity.

6. The method of claim 1, wherein the anchor entity includes an Anchor Mobile Switching Center (AMSC) and an associated Mobile Position Center (AMPC), and wherein the step of subsequently updating the anchor entity with the current location further includes the step of:
sending a Geoposition Direct (GPOSDIR) message including the current location of the subscriber from the AMSC to the AMPC.

7. The method of claim 1, wherein the ESE is an Emergency Services Network Entity.

8. A mobile network for managing an Emergency Services Call (ESC) invoked by a subscriber while the subscriber is engaged in an on-going call that has been handed off from the anchor entity to the serving entity to serve the subscriber at a current location, comprising:
an Anchor Entity for updating the current location prior to setting up the ESC;
a Serving Entity in electronic communication with the Anchor Entity for maintaining the on-going call;
a Position Determining Entity (PDE) in electronic communication with the Serving Entity; for determining the current geographic position of the subscriber;
an Emergency Services Entity (ESE) in electronic communication with the Anchor Entity; and
a 3-way calling function enabling the initiation of the ESC to the ESE while maintaining the on-going call.

9. The network of claim 8, wherein the Serving Entity includes:
a Serving Mobile Switching Center (SMSC) in electronic communication with the PDE; and
an associated Serving Mobile Position Center (SMPC) in electronic communication with the SMSC.

10. The network of claim 8, wherein the Anchor Entity includes:
an Anchor Mobile Switching Center (AMSC) in electronic communication with the Serving Entity; and
an associated Anchor Mobile Position Center (AMPC) in electronic communication with the AMSC.

11. The network of claim 8, wherein the ESE is an Emergency Services Network Entity.

12. A method of managing an Emergency Services Call (ESC) within a mobile network while a non-troubled subscriber is engaged in an on-going call with a troubled subscriber at a troubled location, wherein the network includes a serving entity, an anchor entity, a Position Determination Entity (PDE), and an Emergency Services Entity (ESE), the method comprising the steps of:
handing off the on-going call from the anchor entity to the serving entity;
responsive to an emergency condition, the subscriber invoking the ESC via 3-way calling while maintaining the on-going call
receiving a request for the ESC at the serving entity;
receiving a request for the troubled location of the troubled subscriber at the PDE;
determining the troubled geographic position of the troubled subscriber by the PDE;
receiving the troubled geographic position of the troubled subscriber at the serving entity;
sending the troubled geographic position to the anchor entity; and
setting up the ESC between the anchor entity and the ESE.

13. The method of claim 12, wherein the request for the ESC includes a special key code entered by the subscriber indicating that the troubled geographic position will be determined by the PDE.

* * * * *